United States Patent
Chen et al.

(10) Patent No.: US 10,912,039 B2
(45) Date of Patent: Feb. 2, 2021

(54) METHOD FOR CONTROLLING A TRANSMISSION POWER, MOBILE STATION AND BASE STATION

(71) Applicant: NTT DOCOMO, INC., Tokyo (JP)

(72) Inventors: Xiaohang Chen, Beijing (CN); Anxin Li, Beijing (CN); Qin Mu, Beijing (CN); Liu Liu, Beijing (CN); Huiling Jiang, Beijing (CN); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/326,356

(22) PCT Filed: Aug. 16, 2017

(86) PCT No.: PCT/CN2017/097630
§ 371 (c)(1),
(2) Date: Feb. 18, 2019

(87) PCT Pub. No.: WO2018/033090
PCT Pub. Date: Feb. 22, 2018

(65) Prior Publication Data
US 2020/0196245 A1    Jun. 18, 2020

(30) Foreign Application Priority Data
Aug. 19, 2016  (CN) .......................... 2016 1 0697169

(51) Int. Cl.
*H04W 52/14*  (2009.01)
*H04W 52/22*  (2009.01)
(Continued)

(52) U.S. Cl.
CPC ....... *H04W 52/146* (2013.01); *H04W 52/226* (2013.01); *H04W 52/242* (2013.01);
(Continued)

(58) Field of Classification Search
CPC ............. H04W 52/146; H04W 52/226; H04W 52/242; H04W 52/245; H04W 52/346;
(Continued)

(56) References Cited

U.S. PATENT DOCUMENTS

2017/0155484 A1    6/2017  Kang et al.
2017/0339713 A1*  11/2017  Kimura .................... H04L 5/003
2018/0227903 A1*   8/2018  Uchiyama .......... H04W 72/0446

FOREIGN PATENT DOCUMENTS

CN    104661296 A    5/2015
CN    105227273 A    1/2016
(Continued)

OTHER PUBLICATIONS

International Search Report regarding PCT/CN2017/097630, dated Nov. 14. 2017.
(Continued)

*Primary Examiner* — Shaima Q Aminzay
(74) *Attorney, Agent, or Firm* — Osha Bergman Watanabe & Burton LLP

(57) ABSTRACT

Provided are a method for controlling a transmission power, a mobile station and a base station. The method for controlling the transmit power can be applied to a mobile station, and the method includes: acquiring a power control pattern, which is information related to a scheme of controlling the transmission power; determining a reference power control parameter for the mobile station according to the power control pattern; and determining the transmission power of the mobile station based on the reference power control parameter. The method for controlling the transmission power according to the embodiments of the present disclosure enables the user equipment to transmit signals to the base station at a proper transmission power, and further enables the base station side to distinguish different user (Continued)

equipments according to differences of received powers of a plurality of users that adopt Non-orthogonal Multiple Access.

11 Claims, 8 Drawing Sheets

(51) Int. Cl.
*H04W 52/24* (2009.01)
*H04W 52/34* (2009.01)
*H04W 52/36* (2009.01)

(52) U.S. Cl.
CPC ....... *H04W 52/245* (2013.01); *H04W 52/346* (2013.01); *H04W 52/36* (2013.01)

(58) Field of Classification Search
CPC . H04W 52/36; H04W 52/143; H04W 52/248; H04W 52/42; H04W 72/042; H04W 72/0453; H04W 88/02; H04W 88/08
USPC ......................................................... 455/522
See application file for complete search history.

(56) References Cited

FOREIGN PATENT DOCUMENTS

| CN | 105553608 A | 5/2016 |
|---|---|---|
| CN | 105721123 A | 6/2016 |
| WO | WO-2014/122994 A1 | 8/2014 |

OTHER PUBLICATIONS

International Preliminary Report on Patentability regarding PCT/CN2017/097630, including the English translation of the Written Opinion, dated Feb. 19, 2019.

Extended European Search Report issued in Application No. 17841062.7, dated Mar. 13, 2020 (8 pages).

Ali et al.; "Dynamic User Clustering and Power Allocation for Uplink and Downlink Non-Orthogonal Multiple Access (NOMA) Systems;" Cornell University Library; Aug. 3, 2016; (17 pages).

3GPP TSG RAN WG1 Meeting #86; R1-166871; "NoMA scheme based on NCMA;" LG Electronics; Aug. 22-26, 2016; Gothenburg, Sweden (4 pages).

* cited by examiner

METHOD FOR CONTROLLING A TRANSMISSION POWER, MOBILE STATION AND BASE STATION

CROSS-REFERENCE TO RELATED APPLICATIONS

This application is a 371 U.S. National Stage of International Application No. PCT/CN2017/097630, filed on Aug. 16, 2017, which claims priority to Chinese Application No. 201610697169.6, filed on Aug. 19, 2016. The entire disclosures of the above applications are incorporated herein by reference.

TECHNICAL FIELD

The present disclosure relates to a field of communications technologies, and, in particular, to a method, mobile station and base station for controlling a transmission power.

BACKGROUND

With a rapid development of communication technologies, communication systems capable of supporting various technologies simultaneously or partially include, but not limited to, Global System for Mobile Communications (GSM), Long Term Evolution (LTE), Wideband Code Division Multiple Access (WCDMA), Time Division—Synchronization Code Division Multiple Access (TD-SCDMA) and Code Division Multiple Access (CDMA), or the like. With these communication systems, various user terminals may carry out voice or data communications. The user terminal may be a mobile phone, a tablet computer, or the like. Moreover, the development of the Internet of Things has led to an increasing demand for machine-type communications. Accordingly, user equipments such as home appliances, medical equipments, monitoring equipments, smart electrical meters, also carry out data transmission through various communication systems. Therefore, a large number of user equipments need to access base stations of the communication systems, therefore many communication equipment manufacturers compete to propose technologies related to the fifth generation of mobile communication.

Non-orthogonal Multiple Access is involved in access technologies related to mobile communication systems. In a communication system in which a user adopts the Non-orthogonal Multiple Access (NOMA) technology, it is proposed to distinguish a plurality of mobile stations by the transmission power, so as to, when transmitting uplink data, multiplex data of different mobile stations onto a same sub-band for transmission, thereby increasing the number of mobile stations that the radio base station may support to schedule simultaneously. However, there is no specific solution for how to determine the transmission power of the mobile station, such as to enable the base station side to distinguish a plurality of user equipments that accessed at the same time and at the same frequency according to a received power. If power control is not adopted, for example, each user transmits a signal with a maximal transmission power, it will result in serious interference between adjacent cells which adopt the NOMA access technology. If open loop power control provided in existing LTE systems is directly adopted, it may result in no sufficient difference among transmission powers of a plurality of user equipments received at the base station side, which further makes it difficult to distinguish the users by powers at the base station side.

SUMMARY OF THE INVENTION

Embodiments of the present disclosure provides a method for controlling a transmission power, a mobile station, and a base station used in the field of Non-orthogonal Multiple Access, which enable a user equipment to communicate with a base station with an appropriate transmission power, thereby achieving a technical purpose of distinguishing different accessing users by adopting relatively simple devices at the base station side.

In a first aspect, an embodiment of the present disclosure discloses a method for controlling a transmission power, applied to a mobile station, and the method comprises: acquiring a power control pattern, which is information related to a scheme of controlling the transmission power; determining a reference power control parameter for the mobile station according to the power control pattern; and determining the transmission power of the mobile station based on the reference power control parameter.

In conjunction with the first aspect, in an implementation manner of the first aspect, the mobile station belongs to a power control group in which mobile stations correspond to a same power control pattern, and the acquiring a power control pattern includes: acquiring a power control pattern for the power control group.

In conjunction with the first aspect and the foregoing implementation manner, in another implementation of the first aspect, the acquiring a power control pattern for the power control group includes: determining corresponding relations between respective predefined power control groups and respective power control patterns; determining the power control group to which the mobile station belongs; determining the power control pattern corresponding to the power control group to which the mobile station belongs based on the corresponding relations.

In conjunction with the first aspect and the foregoing implementation, in another implementation of the first aspect, the acquiring a power control pattern for the power control group includes: acquiring a target received signal level of the mobile station and a path loss factor as the power control pattern; wherein the determining a reference power control parameter for the mobile station according to the power control pattern includes: calculating the reference transmission power based on the target received signal level of the mobile station and the path loss factor.

In conjunction with the first aspect and the foregoing implementation, in another implementation of the first aspect, the acquiring a power control pattern for the power control group includes: predefining a plurality of transmission power sets; selecting, from the plurality of transmission power sets, a transmission power set corresponding to the power control group to which the mobile station belongs, as the power control pattern, the selected transmission power set including at least one transmission power value, wherein the determining a reference power control parameter for the mobile station according to the power control pattern includes: determining a transmission power value in the selected transmission power set as the reference power control parameter for the mobile station.

In conjunction with the first aspect and the foregoing implementation, in another implementation of the first aspect, the predefining a plurality of transmission power sets includes: predefining a plurality of transmission power sets each having a different number of transmission power values; the selecting, from a plurality of transmission power sets, a transmission power set corresponding to the power control group to which the mobile station belongs includes:

selecting a transmission power set with less transmission power values when the power control group to which the mobile station belongs is far away from a communication base station; and selecting a transmission power set with more transmission power values when the power control group to which the mobile station belongs is close to the communication base station.

In conjunction with the first aspect, in another implementation of the first aspect, the acquiring a power control pattern includes: acquiring a transmission power offset pattern, which is pattern information related to an offset of the transmission power of the mobile station, as the power control pattern.

In conjunction with the first aspect and the foregoing implementation, in another implementation of the first aspect, the acquiring a transmission power offset pattern as the power control pattern includes: acquiring a common reference threshold; and selecting, based on the common reference threshold and the path loss of the mobile station, a transmission power offset set from at least two candidate transmission power offset sets, each of which includes at least two transmission power offset values, as the power control pattern.

In conjunction with the first aspect and the foregoing implementation, in another implementation of the first aspect, the determining a reference power control parameter for the mobile station according to the power control pattern includes: calculating accessing probability for accessing each of the transmission power offset values in the selected transmission power offset set, based on a number of the transmission power offset values in the selected transmission power offset set; and selecting a transmission power offset value from the selected transmission power offset set according to the accessing probability.

In conjunction with the first aspect and the foregoing implementation, in another implementation of the first aspect, the determining a transmission power of the mobile station based on the reference power control parameter includes: calculating the transmission power of the mobile station based on an initial transmission power of the mobile station and the selected transmission power offset value.

In conjunction with the first aspect and the foregoing implementation, in another implementation of the first aspect, the mobile station belongs to a power control group, in which respective mobile stations correspond to a same power control pattern, and the acquiring a power control pattern includes: acquiring a power control pattern for the power control group.

In conjunction with the first aspect and the foregoing implementation, in another implementation of the first aspect, the mobile station belongs to a power control group, in which respective mobile stations correspond to a same power control pattern, and the acquiring a power control pattern includes: acquiring a power control pattern for the power control group.

In a second aspect, an embodiment of the present disclosure provides a method for controlling a transmission power of a mobile station, applied to a base station, the base station dividing a plurality of mobile stations in its coverage area into different power control groups, and the method may include: deciding a power control group to which the mobile station belongs; determining a power control pattern for the power control group; determining a reference power control parameter for the power control group; and transmitting to the mobile station a control instruction for instructing the mobile station to transmit a power signal based on the reference power control parameter.

In conjunction with the second aspect, in an implementation of the second aspect, the determining a power control pattern for the power control group includes: determining a target received signal level of the mobile station and a path loss factor; wherein the determining a reference power control parameter for the power control group includes: determining a path loss of a mobile station; and calculating the reference transmission power based on the target received signal level, the path loss factor, and the path loss.

In conjunction with the second aspect and the foregoing implementation, in another implementation of the second aspect, the determining a path loss of a mobile station includes: calculating the path loss of the mobile station based on historical uplink transmission data of other mobile stations of the power control group to which the mobile station belongs, in the case where there is no historical uplink transmission data of the mobile station; and calculating the path loss of the mobile station based on the historical uplink transmission data of the mobile station, in the case where there is the historical uplink transmission data of the mobile station.

In a third aspect, an embodiment of the present disclosure provides a mobile station, which may include: a pattern acquiring unit configured to acquire a power control pattern, which is information related to a scheme for controlling a transmission power; a reference determining unit configured to determine a reference power control parameter for the mobile station according to the power control pattern; and a transmission power determining unit configured to determine a transmission power of the mobile station based on the reference power control parameter.

In conjunction with the third aspect, in an implementation of the third aspect, the mobile station belongs to a power control group, in which mobile stations correspond to a same power control pattern; and the pattern acquiring unit is configured to acquire a power control pattern for the power control group.

In conjunction with the third aspect and the foregoing implementation, in another implementation of the third aspect, the pattern acquiring unit includes: a predefining module configured to determine corresponding relations between the respective predefined power control groups and respective power control patterns; a group determining module configured to determine a power control group to which the mobile station belongs based on the reference signal received power of the mobile station; and a pattern determining module configured to determine the power control pattern corresponding to the power control group to which the mobile station belongs, based on the corresponding relations.

In conjunction with the third aspect and the foregoing implementation, in another implementation of the third aspect, the power control pattern acquired by the pattern acquiring unit includes a target received signal level of the mobile station and a path loss factor; wherein the reference determining unit calculates the reference transmission power based on the target received signal level and the path loss factor when the path loss of the mobile station is zero.

In conjunction with the third aspect and the foregoing implementation, in another implementation of the third aspect, the pattern acquiring unit includes: a predefining module configured to predefine a plurality of transmission power sets; and a set selection module configured to select, from the plurality of transmission power sets, a transmission power set corresponding to the power control group to which the mobile station belongs, as the power control pattern, the selected transmission power set including at least one transmission power value, wherein the reference determining unit determines respective transmission power values in the selected transmission power set as the reference power control parameter for the mobile station.

In conjunction with the third aspect and the foregoing implementation, in another implementation of the third aspect, the predefining module predefines the plurality of transmission power sets, each having a different number of transmission power values; the set selecting module selects a transmission power set with more transmission power values, when the power control group to which the mobile station belongs is far away from a communication base station, and selects a transmission power set with fewer transmission power values, when the power control group to which the mobile station belongs is close to the communication base station.

In conjunction with the third aspect, in another implementation of the third aspect, the pattern acquiring unit acquires a transmission power offset pattern, which is pattern information related to an offset of the transmission power of the mobile station, as the power control pattern.

In conjunction with the third aspect and the foregoing implementation, in another implementation of the third aspect, the pattern acquiring unit includes: a receiving module configured to receive a common reference threshold that depends on a path loss; and a selecting module configured to select, based on the common reference threshold and the path loss of the mobile station, a transmission power offset set from at least two candidate transmission power offset sets, each of which includes at least two transmission power offset values, as a power control pattern.

In conjunction with the third aspect and the foregoing implementation, in another implementation of the third aspect, the reference determining unit determines the reference power control parameter for the mobile station by: calculating accessing probability for accessing each of the transmission power offset values in the selected transmission power offset set, based on a number of the transmission power offset values in the selected transmission power offset set; and selecting a transmission power offset value from the selected transmission power offset set according to the accessing probability.

In conjunction with the third aspect and the foregoing implementation, in another implementation of the third aspect, the reference determining unit selects the transmission power offset value from the selected transmission power offset set based on downlink control information received from the base station.

In conjunction with the third aspect and the foregoing implementation, in another implementation of the third aspect, the transmission power determining unit calculates the transmission power of the mobile station based on an initial transmission power of the mobile station and the selected transmission power offset value.

In conjunction with the third aspect and the foregoing implementation, in another implementation of the third aspect, the mobile station belongs to a power control group, in which respective mobile stations corresponds to a same power control pattern, and the pattern acquiring unit acquires a power control pattern for the power control group.

In a fourth aspect, an embodiment of the present disclosure provides a base station, a plurality of mobile stations in an coverage area of the base station being divided into different power control groups, and the base station includes a group judging unit configured to judge a power control group to which the mobile station belongs; a pattern determining unit configured to determine a power control pattern of the power control group; and a reference determining unit configured to determine a reference power control parameter for the power control group; and a transmitting unit configured to transmit to the mobile station a control instruction for instructing the mobile station to transmit a power signal based on the reference power control parameter.

In conjunction with the fourth aspect, in an implementation of the fourth aspect, the pattern determining unit includes: a pattern parameter acquiring module configured to acquire a target received signal level of the mobile station and a path loss factor; a path loss determining module configured to determine a path loss of the mobile station, wherein the reference determining unit calculates the reference transmission power based on the target received signal level, the path loss factor, and the path loss.

In conjunction with the fourth aspect and the foregoing implementation, in an implementation of the fourth aspect, the path loss determining module calculates the path loss of the mobile station based on historical uplink transmission data of other mobile stations of the power control group to which the mobile station belongs, in the case where there is no historical uplink transmission data of the mobile station; and the path loss determining module calculates the path loss of the mobile station based on the historical uplink transmission data of the mobile station, in the case where there is the historical uplink transmission data of the mobile station.

In technical solutions of the method for controlling an uplink transmission power, the mobile station, and the base station according to an embodiment of the present disclosure, the user determines its own transmission power, or the base station transmits the transmission powers of respective mobile stations to the respective mobile stations, such that there is a significant difference between powers of received signals of transmitted information of a plurality of users in NOMA at the base station, thus improving the distinction between the different accessing user equipments by the existing base stations and simplifying a structural complexity degree when the base station distinguishes the different users.

BRIEF DESCRIPTION OF THE DRAWINGS

In order to more clearly illustrate technical solutions of embodiments of the present disclosure, drawings used in descriptions of the embodiments or prior art will be briefly described below. It is obvious that the drawings in the following description are only some embodiments of the disclosure, and those skilled in the art may obtain other drawings according to the drawings without creative work.

DESCRIPTION OF THE EMBODIMENTS

The technical solutions in the embodiments of the present invention will be clearly and completely described below in conjunction with the accompanying drawings in the embodiments of the present invention. It is obvious that the described embodiments are a part of the embodiments of the present invention, rather than all of the embodiments.

With emerging of smart terminals, tablets, social networks or the like, a demand for mobile services will grow explosively, and wireless data traffic and signaling will have an unprecedented impact on mobile communication networks. As predicted by the International Telecommunication Union, the demand for data service capacity of mobile communication networks will reach 1000 times that of 4G commercial networks by 2020. The 4G technology is difficult to meet the above development demand. Moreover, with rapid development of the Internet of Things, future mobile communication needs to address, besides human-to-human communication, human-to-things and things-to-things communications, for example, smart grids, intelligent transportation and other applications. In short, future mobile communication needs to adapt to diverse mobile services and scenarios to enhance user experience.

In order to achieve improved communication capacity, a current consensus is to solve the problem from the following three aspects: physical layer wireless transmission, spectrum resource expansion, and network architecture. The technical solutions provided by the embodiments of the present invention may better improve utilization of spectrum resources, thereby solving a problem of how to efficiently use the gradually exhausted frequency resources to transmit data information at a higher speed.

The technical solutions of the embodiments of the present invention are related technologies based on Non-orthogonal Multiple Access (NOMA). Applying Non-orthogonal Multiple Access in multi-user superposition transmission may increase system throughput and improve spectral efficiency. Currently, there are a plurality of ways to implement Non-orthogonal Multiple Access, and implementing Non-orthogonal Multiple Access in a power domain is a focus of industry research. Implementing Non-orthogonal Multiple Access in the power domain allows a plurality of users to share time and frequency resources in a same spatial layer through multiplexing in the power domain, thereby increasing the number of simultaneously accessing users in the communication system and accordingly increasing an available bandwidth provided for each user. The technical solutions of the following embodiments of the present invention are based on a technical background of implementing Non-orthogonal Multiple Access in the power domain. The purpose of adding the power domain in the Non-orthogonal Multiple Access technology is to achieve multi-user multiplexing by utilizing different path losses for respective users.

Figure 1A:
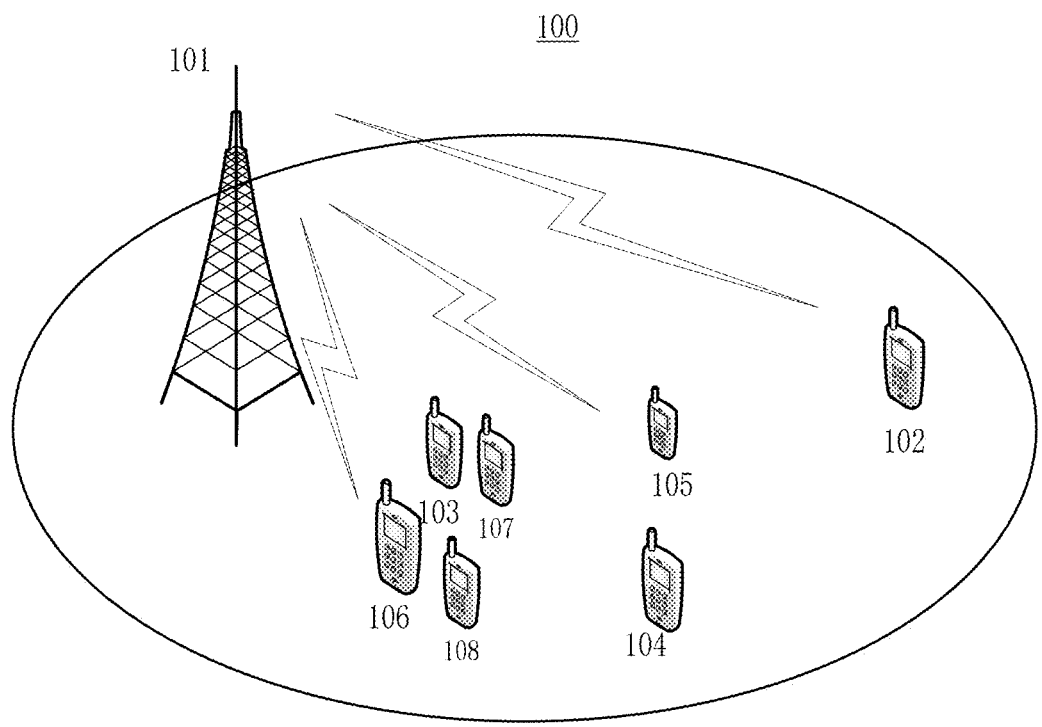
FIG. 1A and FIG. 1B are schematic diagrams schematically illustrating an application scenario according to an embodiment of the present disclosure.

FIG. 1A is a schematic diagram schematically illustrating an application scenario according to an embodiment of the present disclosure. As shown in FIG. 1, a base station 101 in a communication system (which for example may be a fifth generation of mobile communication system or other communication system adopting Non-orthogonal Multiple Access) covers an elliptical cell, and there are seven user equipments (102, 103, 104, 105, 106, 107 and 108) located in different locations of the cell. Although the user equipment in FIG. 1A is a mobile phone, the user equipment referred to in the following embodiments of the present invention is not limited to a mobile phone terminal. The user equipment referred to in the following embodiments may be any physical device having data acquisition and processing capabilities, for example, may include a drone or the like. Moreover, the embodiments provided by the present invention do not limit a specific number of the user equipments accessing in one cell. Moreover, when the respective user equipments (102, 103, 104, 105, 106, 107 and 108) enter the cell, they may receive broadcast information of the base station 101. Based on the received broadcast information, the user equipments (102, 103, 104, 105, 106, 107 and 108) learn a basic situation of the base station 101, or receive information related to uplink or downlink power control for one or more users which is transmitted by the base station (for example, the related information may include related information such as a power control pattern or a power control group provided in the embodiment of the present invention), and the user equipments (102, 103, 104, 105, 106, 107 and 108) may transmit initial access signals (initial access powers $P_{k\_init}$ needs to be recorded in the embodiment of the present invention) to the base station 101, to request access to the base station 101. The base station 101 carries out communication information interaction with the user equipments (102, 103, 104, 105, 106, 107 and 108) in response to the initial access signals, and allocates resources to the user equipments (102, 103, 104, 105, 106, 107 and 108), where the resources may include: access frequency bands of the users, access time of the users, transmission powers of the users (for example, the transmission powers of respective user equipments are transmitted from the base station to the user equipments as provided in the following Embodiment 4), or the like. The user equipments (102, 103, 104, 105, 106, 107 and 108) are thereby allowed to access the base station 101 for subsequent communication. Distances between the seven user equipments (102, 103, 104, 105, 106, 107 and 108) and the base station 101 in FIG. 1A may be different from each other.

Moreover, the seven user equipments (102, 103, 104, 105, 106, 107 and 108) in FIG. 1A access the base station 101 of the communication system based on the non-orthogonal multiple access technology, and the Non-orthogonal Multiple Access technology may achieve multi-user multiplexing by different path losses for respective users. That is to say, the base station 101 may utilize differences among powers of uplink signals which it receives from a plurality of user equipments to distinguish the respective user equipments. The following embodiments of the present invention may determine the transmission powers of the respective user equipments, i.e., control the uplink transmission powers of the respective user equipments, based on interaction information between the base station and the user equipments, so that the base station side may utilize the received power differences to distinguish the plurality of accessing user equipments. The following embodiments of the present invention are specifically summarized as that, firstly respective transmission powers of the user equipments (102, 103, 104, 105, 106, 107 and 108) are determined, then the base station 101 distinguishes respective signals from the different user equipments according to received powers of signals of the respective user equipments (102, 103, 104, 105, 106, 107 and 108) it receives.

Figure 1B:
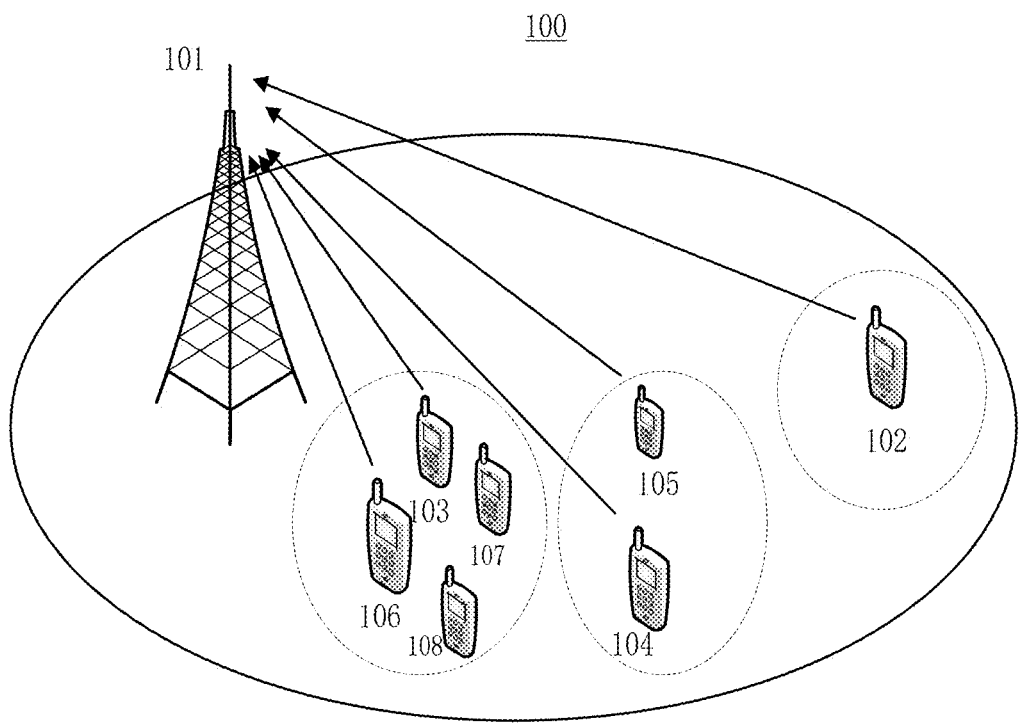

FIG. 1B schematically illustrates a background diagram for determining a transmission power of an uplink adopting the Non-orthogonal Multiple Access technique according to some embodiments of the present disclosure. Referring to FIG. 1B, the figure schematically illustrates an idea of grouping processing that may be based on when the transmission powers of respective users are determined in the embodiment of the present disclosure (that is, the power control group to which the mobile station belong as provided in the following embodiments; for details, please refer to the first embodiment, the second embodiment, or the like). That is, in the following several embodiments, when determining the transmission powers of the users, the user equipments need to be firstly divided into several power control groups, then the base station 101 uses the respective power control group as objects of receiving power control patterns, then the user equipment determines the uplink transmission power based on the power control pattern received from the base station 101, or the base station determines the uplink transmission power according to the power control pattern it obtained (the arrow in the figure shows a transmission direction of the uplink, i.e., the direction in which information is transmitted from the user equipment to the base station). However, not all the embodiments provided by the present invention are based on the grouping strategy shown in FIG. 1B. In some embodiments below, it is not necessary to group the user equipments in advance, and it is needless to introduce the power control group, instead, each user equipment determines directly the transmission power of its own (for example, in the third embodiment below, or the like).

Moreover, the three groups shown in FIG. 1B (shown by dotted circles in FIG. 1B, where a plurality of user equipments in each dotted circle form one power control group) may be a plurality of power control groups obtained by division according to distances between the user equipments and the base station, that is, all user equipments accessing the base station 101 are divided into three groups according to the distances of the user equipments from the base station in FIG. 1B. However, it should be noted that the embodiments of the present disclosure do not limit the specific number of the groups and the principle and basis for grouping. That is to say, the user equipments may be divided into any number (more than 3) of groups according to the needs of a specific scenario, and certainly may be divided into two groups or may be not grouped. An another example, user equipments located in different areas but at the same distance may be divided into different groups, so the distance is not the only and necessary basis for dividing the power control group. For example, in FIG. 1B, seven user equipments are divided into three power control groups according to their distances from the base station. For the convenience of the description of the disclosed embodiment, the three power control groups may be respectively named as a central user group 1 including the mobile phone 103, the mobile phone 106, the mobile phone 107 and the mobile phone 108, a middle user group 2 including the mobile phone 105 and the mobile phone 104, and an edge user group 3 including the device 102, and the names of the three groups defined here will continue to be used in some embodiments involving the grouping processing.

Figure 2:
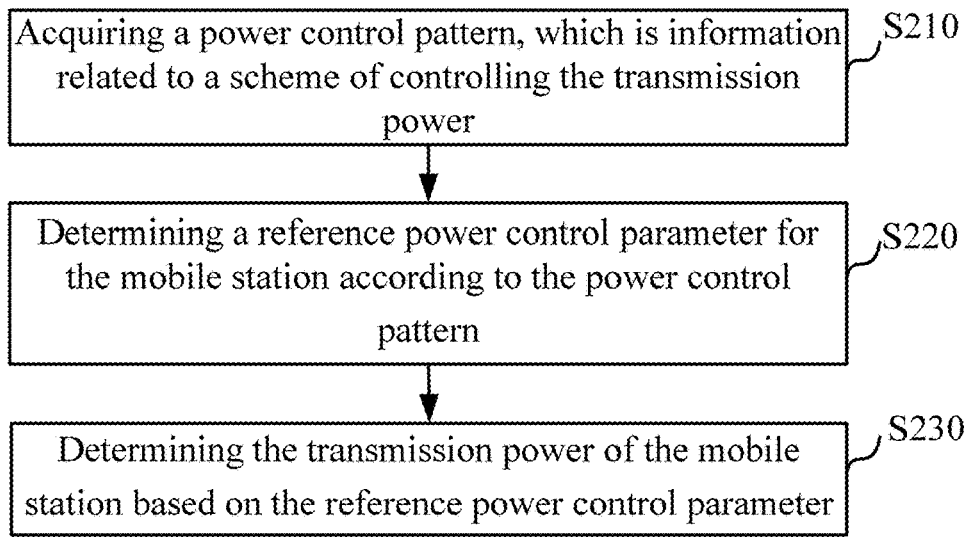
FIG. 2 is a flow chart schematically illustrating a method for controlling a transmission power according to an embodiment of the present disclosure.

FIG. 2 is a flow chart schematically illustrating a method 200 for controlling a transmission power in accordance with an embodiment of the present disclosure. The method 200 for controlling the transmission power may be applied to respective user equipments (e.g., mobile stations) shown in FIG.

As shown in FIG. 2, the method 200 for controlling the transmission power may include: acquiring a power control pattern, which is information related to a scheme of controlling the transmission power (S210); determining a reference power control parameter for the mobile station according to the power control pattern (S220); and determining the transmission power of the mobile station based on the reference power control parameter (S230).

In S210, the mobile station belongs to a power control group, where mobile stations in the power control group correspond to a same power control pattern, and the acquiring a power control pattern includes: acquiring a power control pattern for the power control group. The step of acquiring the power control pattern for the power control group in this case may include determining corresponding relations between respective predefined power control groups and respective power control patterns; determining the power control group to which the mobile station belongs; and determining the power control pattern corresponding to the power control group to which the mobile station belongs based on the corresponding relations. For example, the base station may determine the groups and the power control patterns corresponding to respective groups according to location information of the mobile stations when the mobile stations access the base station. Moreover, a mobile station may receive high layer signaling from the base station and determines the power control pattern of the mobile station from the high layer signaling. For example, the base station may give a number of the power control pattern in the high layer signaling, and the mobile station receives the high layer information and obtains the number corresponding to the power control pattern by parsing the information. As another example, the base station 101 may transmit a same power control pattern to the mobile stations in each power control group, then each of the mobile stations acquires its respective power control pattern in response to the power control pattern transmitted by the base station. The embodiments of the present invention do not limit the number of the groups and the basis for the grouping. For example, all mobile stations may be divided into four power control groups, i.e. central user equipments, first middle user equipments, second middle user equipments, and edge user equipments, according to the distances between the mobile stations and the base station, and the distances between the above four power control groups and the base station are increasing, i.e., the distance between the central user equipments and the base station is smaller than the distance between the first middle user equipments and the base station, and the distance between the first middle user equipments and the base station is smaller than the distance between the second middle user equipments and the base station, and the distance between the second middle user equipments and the base station is smaller than the distance between the edge user equipments and the base station.

Moreover, in step S210, the mobile station may not belong to any power control groups. In this case, the base station 101 may transmit to all user equipments their respective power control patterns, or may transmit to all user equipments a same power control pattern, then each user equipment, i.e., the mobile station, determines a reference power control parameter for the mobile station according to the power control pattern and ultimately obtains the transmission power of the mobile station.

In step S220, the reference power control parameter may include a reference transmission power which is obtained by each mobile station based on the received power control pattern, or may be a transmission power selected by the mobile station from transmission power sets, or may be obtained by calculating, based on a number of the transmission power offset values in a selected transmission power offset set, accessing probability for accessing each of the transmission power offset values in the set, and selecting a transmission power offset value from the selected transmission power offset set according to the accessing probability as the reference power control parameter.

In step S230, the step of determining a transmission power of the mobile station based on the reference power control parameter may include: calculating the transmission power of the mobile station based on an initial transmission power of the mobile station and the selected transmission power offset value. For example, the initial transmission power may be a transmission power of the user equipment at the time of initially accessing the base station.

A specific embodiment of the method corresponding to FIG. 2 when grouping (i.e., dividing all mobile stations into a plurality of power control groups) is a processing object will be described in detail below with reference to FIGS. 3 and 4.

First Embodiment

Figure 3:
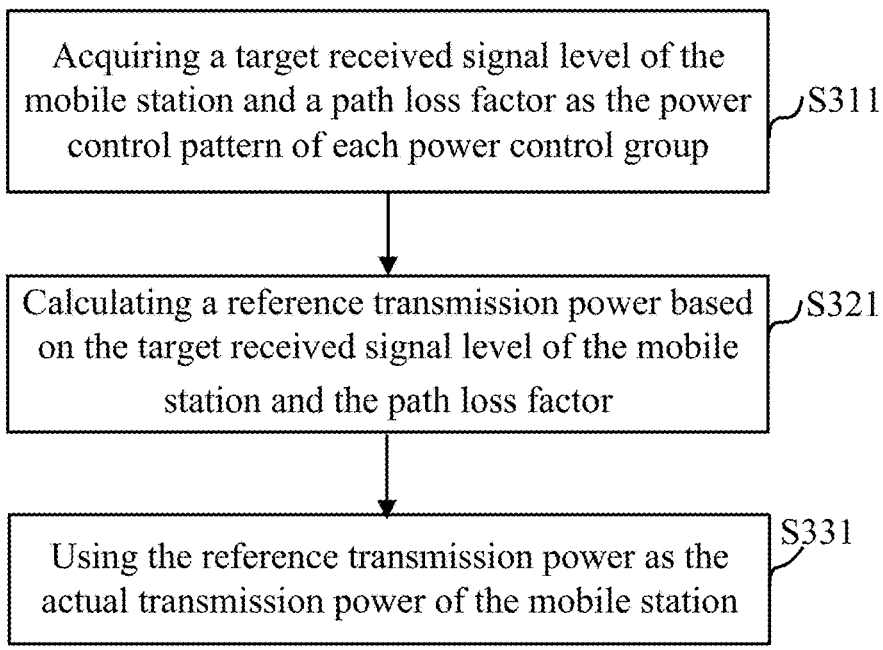
FIG. 3 is a flow chart schematically illustrating a method for controlling a transmission power provided in a first embodiment.

FIG. 3 is a flow chart schematically illustrating one embodiment of a method for controlling a transmission power of FIG. 2 when grouping is a processing object, where S311 shown in FIG. 3 is an example for acquiring the power control pattern as shown in FIG. 2, S321 shown in FIG. 3 is an example for determining the reference power control parameter for the mobile station as shown in FIG. 2, and S331 shown in FIG. 3 is an example for determining the transmission power of the mobile station based on the reference power control parameter as shown in FIG. 2. Moreover, a target received signal level and a path loss factor in S311 correspond to the power control pattern shown in FIG. 2. Referring to FIG. 3, the method for controlling the transmission power may include: acquiring the target received signal level of the mobile station and the path loss factor as the power control pattern of each power control group (S311); calculating a reference transmission power based on the target received signal level of the mobile station and the path loss factor (S321); and using the reference transmission power as the actual transmission power of the mobile station (S331). Moreover, in order to implement the method of FIG. 3 for controlling the transmission power, the mobile station may further perform the following processing before S311: determining corresponding relations between respective predefined power control groups and respective power control patterns; determining the power control group to which the mobile station belongs; determining the power control pattern corresponding to the power control group to which the mobile station belongs based on the corresponding relations. The base station then transmits the power control pattern to the corresponding power control group. Then, the mobile station in the power control group obtains the power control pattern, and specifically in the present embodiment, acquires the target received signal level of the mobile station and the path loss factor.

In S321, the mobile station may calculate the reference transmission power according to for example the following formula:

$$P_i = \min\{P_{MAX}, 10 \log 10(M_i) + P_0 + \alpha * PL_i\},$$

where the parameter $P_0$ represents the target received signal level when the path loss of mobile station is zero; a represents the path loss factor, which may be the path loss factor obtained based on a Fractional Transmission Power Control (FTPC) method; $P_{MAX}$ is a maximal transmission power; $PL_i$ represents the path loss of the i-th user, which is the loss generated by transmission of a radio wave in the space, and reflects a change trend of an average value of the received signal level of the radio wave in a spatial distance within a macro range; and $M_i$ represents a unit bandwidth, which may be one or more resource blocks.

Second Embodiment

Figure 4:
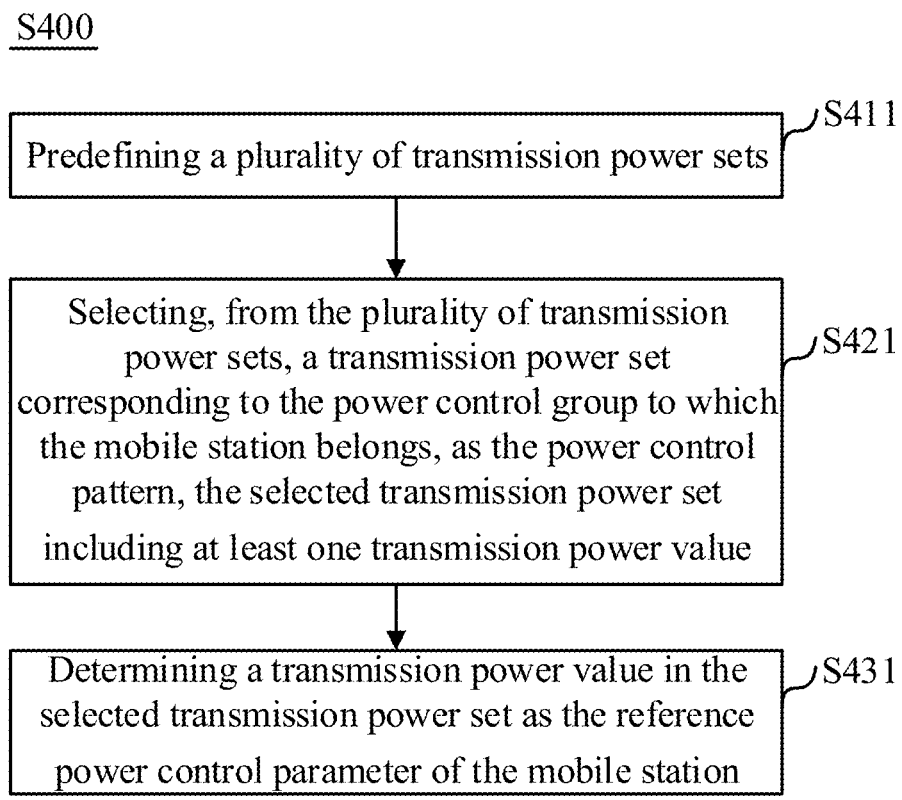
FIG. 4 is a flow chart schematically illustrating a method for controlling a transmission power provided in a second embodiment.

FIG. 4 is a flow chart schematically illustrating another embodiment of the method for controlling the transmission power of FIG. 2 when grouping is a processing object, where S411 shown in FIG. 4 is an example for acquiring the power control pattern as shown in FIG. 2, S421 shown in FIG. 4 is an example for determining the reference power control parameter for the mobile station as shown in FIG. 2, S431 shown in FIG. 4 is an example for determining the transmission power of the mobile station based on the reference power control parameter as shown in FIG. 2. Moreover, the power control pattern shown in FIG. 2 corresponds to a transmission power set corresponding to the power control group to which the mobile station belongs in S421 in FIG. 4. As shown in FIG. 4, the method for controlling the transmission power may include: predefining a plurality of transmission power sets (S411); selecting, from a plurality of transmission power sets, a transmission power set corresponding to the power control group to which the mobile station belongs, as the power control pattern, where the selected transmission power set includes at least one transmission power value (S421); determining a transmission power value in the selected transmission power set (the transmission power value may be directly used as the actual transmission power of the mobile station) as the reference power control parameter for the mobile station (S431). Moreover, in order to implement the method for controlling the transmission power in FIG. 4, the mobile station may further perform the following processing before S411: determining corresponding relations between respective predefined power control groups and respective power control patterns; determining the power control group to which the mobile station belongs; determining the power control pattern corresponding to the power control group to which the mobile station belongs based on the corresponding relations.

The plurality of transmission power sets $P_{total}$ may be predefined by the base station in S411, where the plurality of transmission power sets $P_{total}$ include a plurality of power sets and any one of the power sets may be represented as $P_{set\_i}$, i.e., $P_{total} = \{P_{set\_1}, P_{set\_2}, \ldots, P_{set\_M}\}$. Moreover, a number M of the power sets included in the transmission power set $P_{total}$ should be at least equal to the number of groups (i.e., the total number M of transmission power sets is greater than or equal to the total number of the divided power control groups). In this embodiment, signaling transmitted by the base station to the mobile station may be adopted to carry the power set selected by the power control group. Specifically, the base station may transmit a sequence number of the power set to each power control group composed by the mobile stations. After obtaining the signaling message, the mobile station obtains the power set sequence number by parsing the message, and obtains the specific power set $P_{set\_i}$ corresponding to the power control group where the mobile station is located through the power set sequence number, where the parameter i is greater than 1 and less than or equal to M.

Moreover, the operation of predefining a plurality of transmission power sets at S411 may include (not shown in the figure): predefining a plurality of transmission power sets each having a different number of transmission power values. in this case, the operation of selecting, in the S421, from the plurality of transmission power sets, the transmission power set corresponding to the power control group to which the mobile station belongs includes: selecting a transmission power set with less transmission power values when the power control group to which the mobile station belongs is far away from the communication base station, and selecting a transmission power set with more transmission power values when the power control group to which the mobile station belongs is close to the communication base station. A specific example provided by the present invention is illustrated in conjunction with FIG. 1B. In the example, the plurality of transmission power sets include three transmission power sets, which are a first power set, a second power set, and a third power set, respectively. Therein, the first power set includes four different transmission power values, the second power set includes two different transmission power values, and the third power set includes one transmission power value. As shown in FIG. 1B, there are three power control groups corresponding to the example. In this case, according to the above principle, the central user group 1 shown in FIG. 1B may select the first power set (i.e., select the first power set with the most transmission power values when the power control group where the mobile station is located is closest to the communication base station), the middle user group 2 may select the second power set, and the edge user group 3 may select the third power set (i.e., select the third power set with least transmission power values when the power control group where the mobile station is located is farthest from the communication base station). The main purpose of adopting the example is to allocate a power set with more transmission power values to a power control group with more accessing users for selection by the respective mobile stations. This may effectively improve efficiency and accuracy of distinguishing, at the receiving end, users of a power control group with similar path losses.

In addition, after the mobile station obtains its own corresponding power set from the plurality of transmission power sets, the mobile station may also randomly select one of a plurality of transmission power values included in the selected power set, as its actual transmission power value (not shown in the figure), and this step may correspond to the step of determining the transmission power of the mobile station based on the reference power control parameter as shown in S230 of FIG. 2. Moreover, the mobile station may calculate accessing probability for accessing each of the transmission power values in the selected power set, based on a number of the transmission power values in the selected power set, and select the transmission power value from the selected power set according to the accessing probability. Additionally, the mobile station may receive downlink control information from the base station, and select the transmission power value from the selected power set based on the downlink control information. In this case, the downlink control information may include information related to an automatic repeat request.

A specific embodiment of the method corresponding to FIG. 2 when the mobile stations are not grouped will be described in detail below through FIG. 5.

Third Embodiment

A specific implementation of acquiring the power control pattern involved in FIG. 2 in this embodiment may include: acquiring a transmission power offset pattern, which is pattern information related to an offset of the transmission power of a mobile station, as the power control pattern.

Figure 5:
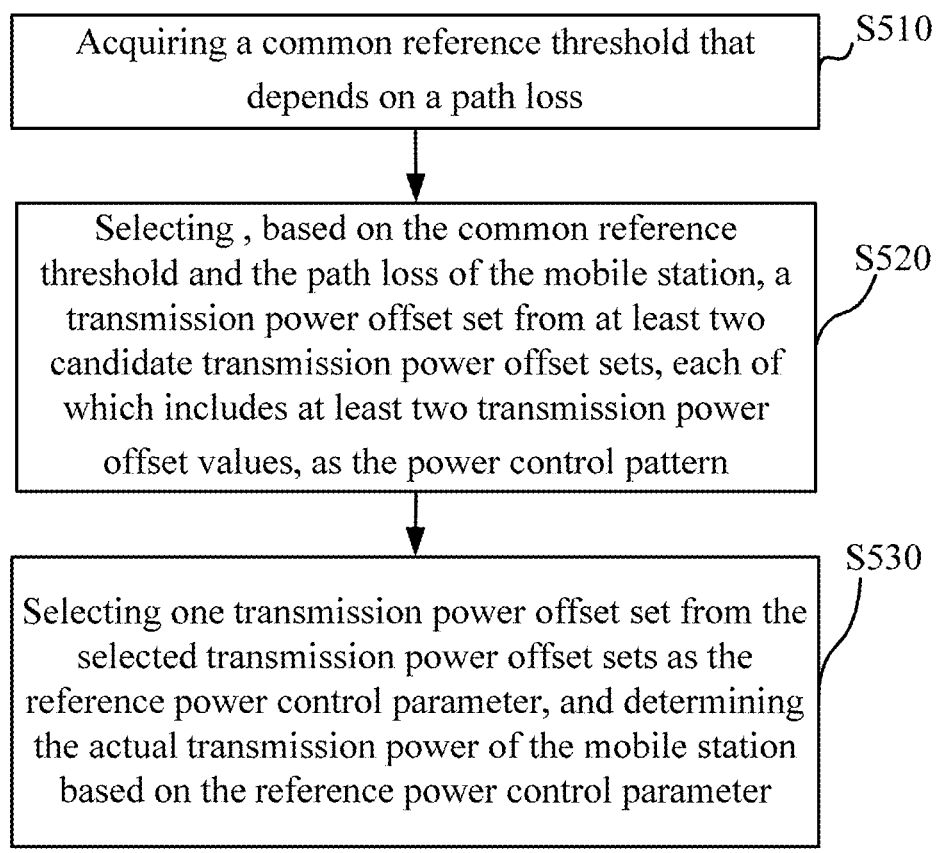
FIG. 5 is a flow chart schematically illustrating a method for controlling a transmission power provided in a third embodiment.

FIG. 5 is a flow chart schematically illustrating one embodiment of the method for controlling the transmission power of FIG. 2 when grouping is not a processing object, where S510 shown in FIG. 5 is an example for acquiring a power control pattern as shown in FIG. 2, S520 shown in FIG. 5 is an example for determining the reference power control parameter for the mobile station as shown in FIG. 2, S530 shown in FIG. 5 is an example for determining the transmission power of the mobile station based on the reference power control parameter as shown in FIG. 2. Moreover, the power control pattern shown in FIG. 2 corresponds to a transmission power offset set selected from at least two candidate transmission power offset sets in S520 of FIG. 5. As shown in FIG. 5, the method for controlling the transmission power may include: acquiring a common reference threshold that depends on path loss (S510); selecting, based on the common reference threshold and the path loss of the mobile station, the transmission power offset set from at least two candidate transmission power offset sets each of which includes at least two transmission power offset values, as the power control pattern (S520); selecting one transmission power offset from the selected transmission power offset set as the reference power control parameter, and determining the actual transmission power of the mobile station based on the reference power parameter (S530).

The common reference threshold in S510 shown in FIG. 5 may be a threshold associated with the path loss. For example, the common reference threshold may be an average reference signal received power (RSRP) obtained based on reference signal received powers of a plurality of mobile stations.

The selecting the transmission power offset set from at least two candidate transmission power offset sets in S520 shown in FIG. 5 may specifically be performed as follows. When the common reference threshold in S510 is the average reference signal received power, the specific step for selecting the transmission power offset set from the two candidate transmission power offset sets including a first transmission power offset set and a second transmission power offset set may include: calculating the reference signal received power of the mobile station; comparing the calculated reference signal received power of the mobile station with the common reference threshold (i.e., the average reference signal received power); and selecting by the mobile station the first transmission power offset set when the former is larger than the latter, otherwise selecting by the mobile station the second transmission power offset set. Moreover, each candidate transmission power offset set includes a plurality of transmission power offsets.

S530 shown in FIG. 5 specifically includes selecting one transmission power offset from the selected transmission power offset sets in S520 as the reference power control parameter. The manner in which the transmission power offset is selected in S530 may adopt the following first or second example. However, the following two examples are not intended to limit the implementations of S530, and a randomly selecting method in which the mobile station randomly selects one transmission power offset from the selected transmission power offset set as the reference power control parameter, or the like may also be adopted to implement S530.

As a first example of S530, the determining the reference power control parameter for the mobile station according to the power control pattern in S530 may include: calculating accessing probability for accessing each of the transmission power offset values in the selected transmission power offset set, based on a number of the transmission power offset values in the selected transmission power offset set; and selecting the transmission power offset value from the selected transmission power offset set according to the accessing probability.

A formula for calculating the accessing probability in the above example may be:

$$(Np-1)/N;$$

where N represents the number of the transmission power offset values, and Np represents a predetermined value.

As a second example of S530, the determining the reference power control parameter for the mobile station according to the power control pattern in S530 may further include: receiving downlink control information from the base station; and selecting the transmission power offset value from the selected transmission power offset set based on the downlink control information.

The downlink control information in the second example above may include information related to an automatic repeat request. Therein, when there are many automatic repeat request HARQ feedbacks, it indicates that the transmission of the mobile station fails, so it is necessary to increase the transmission power of the mobile station, in which case the mobile station should select the transmission power offset value that may increase its transmission power from the transmission power offset set; when there are few automatic repeat request HARQ feedbacks, it indicates that the possibility that the transmission of the mobile station succeeds is high, so there is no need to increase the transmission power of the mobile station, in which case the mobile station may select a transmission power offset value that may maintain its transmission power from transmission power offset sets, or attempt to select the transmission power offset value that reduces its transmission power.

The determining the actual transmission power of the mobile station based on the reference power parameter in S530 shown in FIG. 5 may specifically include: calculating the transmission power of the mobile station based on the initial transmission power of the mobile station and the selected transmission power offset value.

For example, the transmission power of the mobile station may be obtained by the following formula:

$$P_{k\_actual} = P_{k\_init} + \Delta P_k \quad (1)$$

where $P_{k\_init}$ represents the initial transmission power when user accesses the base station, $\Delta P_k$ represents the transmission power offset value selected by the mobile station, and k represents the k-th transmission power offset value in the transmission power offset set.

In addition, when determining the actual transmission power of the mobile station based on the reference power parameter in S530, the transmission power of the mobile station may be obtained by the following formula (corresponding to S230 of FIG. 2):

$$P_{k\_actual} = P_{k\_ref} + \Delta P_k \quad (2)$$

where $P_{k\_ref}$ is the reference transmission power, and $\Delta P_k$ represents the transmission power offset value selected by the mobile station.

The method for calculating the transmission power $P_{k\_actual}$ in the above formula (2) is obtained according to the solution of the first embodiment or the second embodiment and a part of the solution of the third embodiment. Specifically, it may be briefly described as follows. Firstly, the reference transmission power $P_{k\_ref}$ in the above formula is determined by the complete technical solution of the first embodiment or the second embodiment, then $\Delta P_k$ is selected by adopting the technical solution of selecting the transmission power offset value provided in the third embodiment in at least one power control group, and finally the actual transmission power $P_{k\_actual}$ of the mobile station is determined based on the obtained reference transmission power $P_{k\_ref}$ and the transmission power offset value and the above formula. Take the second embodiment as an example. Firstly, the entire technical solution of the second embodiment is adopted. That is, the plurality of transmission power sets are predefined (corresponding to S411 in FIG. 4), and the transmission power set corresponding to the power control group to which the mobile station belongs is selected from the plurality of transmission power sets, as the power control pattern, where the selected transmission power set including at least one transmission power value (corresponding to S421 in FIG. 4). Then, the mobile station selects the transmission power value from the selected transmission power set as the actual transmission power value, where the actual transmission power value here is used as the value of the parameter $P_{k\_ref}$ in the above formula. Secondly, at least one power control group is selected from the plurality of power control groups, and then for the selected power control group, the transmission power offset value is selected and obtained by adopting the part of technical solution of the third embodiment. Specifically, a common reference threshold for a certain power control group is acquired (corresponding to S510 in FIG. 5); the transmission power offset set is selected, based on the common reference threshold and the path loss of the mobile station, from at least two candidate transmission power offset sets each of which includes at least two transmission power offset values, as the power control pattern (corresponding to S520 in FIG. 5); the reference power control parameter for the mobile station is determined according to the power control pattern (corresponding to S530 in FIG. 5), specifically, the transmission power offset value is selected from the selected transmission power offset set. Then, the selected transmission power offset value is used as the value of the transmission offset $\Delta P_k$ in the above formula. Finally, the actual transmission powers $P_{k\_actual}$ of all mobile stations in the selected power control group are obtained according to the above formula (2). For the power control groups that are not selected, the actual transmission powers of the mobile stations in the groups may continue to be determined by the formula (1), or alternatively may directly use the reference transmission powers determined by the first embodiment or the second embodiment. In addition, the power offset value $\Delta P_k$ may be firstly selected by adopting the part of solution of the third embodiment, then the actual transmission power is obtained as the reference transmission power $P_{k\_ref}$ in the above formula (2) according to the solution of the first embodiment or the second embodiment, and finally the actual transmission power of the mobile station is obtained according to formula (2). For the solution that combines the first embodiment and the third embodiment, it may be described referring to the above solution that combines the second embodiment and the third embodiment, and details are not described herein.

The present embodiment may significantly improve accuracy and efficiency of distinguishing different user equipments in the power control group with many accessing users at the base station side according to the received powers, by adopting the technical solution that combines the first embodiment or the second embodiment with the third embodiment.

Moreover, the transmission power offset pattern involved in the third embodiment may also be used as the power control pattern of each power control group, and for the power control groups having the same power control pattern, the method for controlling the transmission power shown in FIG. 5 may also be separately implemented. Although the above content illustrates the specific technical solution by only taking the example where the mobile station does not belong to any power control group, the transmission power of the mobile station belonging to a certain power control group may be obtained by referring to the above respective embodiments (in this case, it only needs to apply the method shown in FIG. 5 for each power control group respectively), and the specific implementation details are not described herein.

Fourth Embodiment

An embodiment for determining a transmission power of a mobile station at a base station side is disclosed below in conjunction with FIG. 6.

Figure 6:
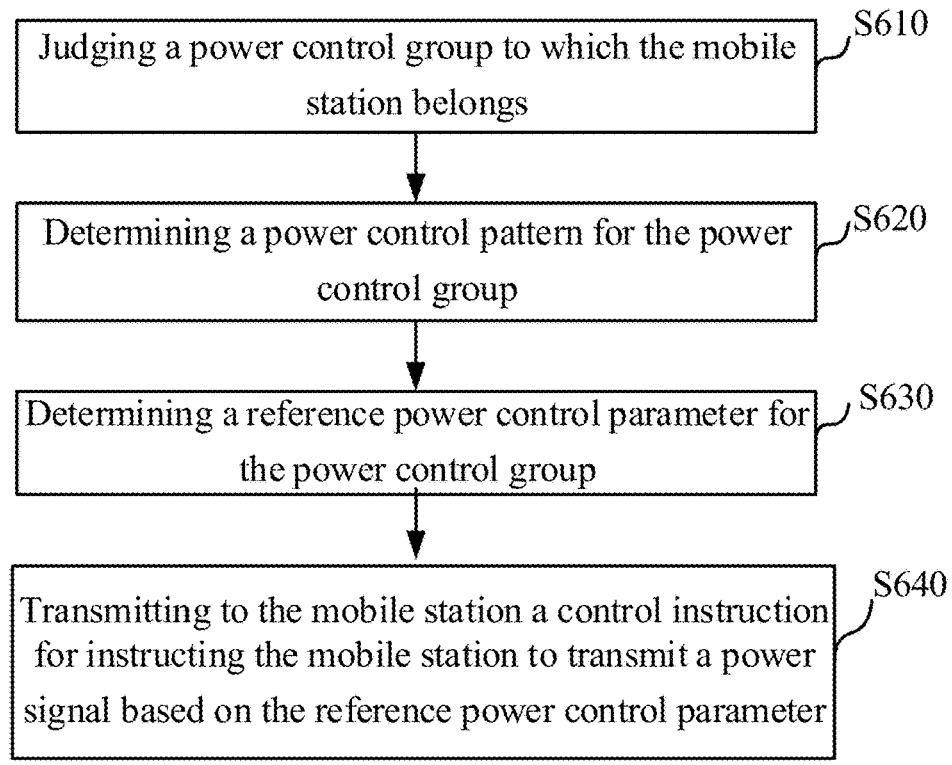
FIG. 6 is a flow chart schematically illustrating a method for controlling a transmission power provided in a fourth embodiment.

FIG. 6 is a flow chart schematically illustrating one embodiment of a method for controlling the transmission power. The method 600 for controlling the transmission power of the mobile station is applied to the base station, which divides a plurality of mobile stations in its coverage area into different power control groups. The method 600 may include: judging a power control group to which the mobile station belongs (S610); determining a power pattern for the power control group (S620); determining a reference power control parameter for the power control group (S630); and transmitting to the mobile station a control instruction for instructing the mobile station to transmit a power signal based on the reference power control parameter (S640).

For an implementation of S610, reference may be made to the related description in the foregoing embodiments, and details are omitted herein.

The determining the power control pattern for the power control group in S620 may include: determining a target received signal level of the mobile station and a path loss factor. In this case, the determining the reference power control parameter for the power control group described in S630 may include: determining a path loss of the mobile station; and calculating the reference transmission power based on the target received signal level, the path loss factor, and the path loss. In addition, the step of determining the path loss of the mobile station may include: calculating the path loss of the mobile station based on historical uplink transmission data of other mobile stations of the power control group to which the mobile station belongs, in the case where there is no historical uplink transmission data of the mobile station; and calculating the path loss of the mobile station based on the historical uplink transmission data of the mobile station, in the case where there is the historical uplink transmission data of the mobile station. In addition, the mobile station may take the calculated reference transmission power as the actual transmission power.

The reference transmission power calculated in S630 may be directly used as a part of content of the control instruction at S640. The mobile station then receives the control instruction, obtains the reference transmission power by parsing the control instruction, and uses the reference transmission power as the actual transmission power of the mobile station.

Other embodiments related to the fourth embodiment will be described below.

The technical solution of the embodiment shown in FIG. 6 may also be combined with the technical solution of the third embodiment to obtain another embodiment for determining the actual transmission power of the mobile station. In this case, the mobile station may calculate its actual transmission power according to the following formula:

$$P_{k\_actual}=P_{k\_ref}+\Delta P_k \qquad (3)$$

where $P_{k\_ref}$ may be a reference transmission power, and $\Delta P_k$ represents a transmission power offset value selected by the mobile station.

Specifically, firstly, the mobile station obtains the value of the reference transmission power $P_{k\_ref}$ in the above formula (3) by adopting the technical solution provided in FIG. 6. Secondly, at least one power control group is selected, and then the part of technical solution of the third embodiment is applied for the mobile station in the selected power control group, and the specific processing may include: acquiring a common reference threshold for a certain power control group (corresponding to S510); selecting, based on the common reference threshold and the path loss of the mobile station, the transmission power offset set from at least two candidate transmission power offset sets each of which includes at least two transmission power offset values, as the power control pattern (corresponding to S520); and selecting the transmission power offset value from the selected transmission power offset set (corresponding to S530). The selected transmission power offset value is used as the value of $\Delta P_k$ in the above formula (3). Finally, the transmission powers $P_{k\_actual}$ of all mobile stations in the selected power control group are obtained according to the above formula (3). For the power control groups that are not selected, the transmission powers of the mobile stations may continue to be determined by adopting formula (1), or alternatively, the reference transmission powers determined by adopting the first embodiment or the second embodiment may be directly used as the actual transmission powers of the mobile stations.

Moreover, in some embodiments, the method 600 applied to the base station for controlling the transmission power of the mobile station may include only: judging the power control group to which the mobile station belongs (S610); determining the power control pattern for the power control group (S620); and transmitting the power control pattern to the mobile station. The transmission power may then be determined by the user side device (i.e., the mobile station) according to the received power control pattern. For example, by the solutions of the first embodiment, the second embodiment, and the third embodiment, it may be realized that the mobile station determines the transmission power of its own according to its respective power control pattern.

In order to achieve an optimal technical effect, a preferable technical solution of the embodiment of the present disclosure may include: firstly, distinguishing effectively users of different power control groups by adopting path loss differences at the base station side (specifically, refer to the first embodiment and the second embodiment above); secondly, further increasing discrimination degrees among a plurality of users in a same power control group by utilizing power offset values randomly selected by respective users in the same power control group (specifically, refer to the related content regarding selecting the power offset value in the third embodiment). However, the embodiment of the present disclosure may distinguish users of different power control groups by only adopting the path losses when there are few users in the power control group (for example, only the solution such as the first embodiment, the second embodiment, the fourth embodiment, or the like is adopted), and the users within one power control group may be further distinguished by the path losses. Moreover, for the base stations with few accessing users, the technical solution of randomly selecting the power offset value to obtain the actual transmission power (e.g. the third embodiment) may also be adopted separately to achieve effective distinguishing of the user equipments at the base station side. The disclosure of this paragraph herein is only used to enumerate some application scenarios of the embodiments of the present disclosure, but not to exhaust all corresponding relations between the application scenarios and the embodiments, and those skilled in the art may flexibly select one embodiment or a combined embodiment of the above plurality of embodiments according to a specific situation.

Structures of the mobile station and the base station of the embodiment of the present disclosure will be described in detail below in conjunction with FIGS. 7-11.

Figure 7:
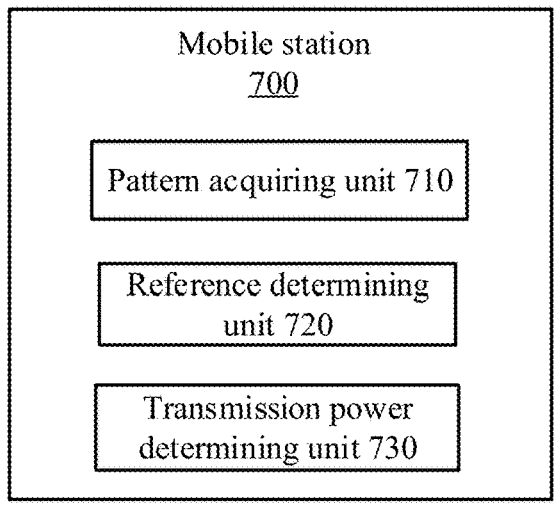
FIG. 7 is a block diagram schematically illustrating a structure of a mobile station according to an embodiment of the present disclosure.

FIG. 7 is a block diagram schematically illustrating the structure of the mobile station 700 in accordance with the embodiments of the present disclosure. The mobile station corresponds to each user equipment shown in FIG. 1, and the mobile station 700 may be used to perform the technical solutions of the related embodiments described above, such as the first embodiment, the second embodiment, the third embodiment, or the like.

As shown in FIG. 7, the mobile station 700 may include: a pattern acquiring unit 710 configured to acquire a power control pattern, which is information related to a scheme for controlling the transmission power; a reference determining unit 720 configured to determine a reference power control parameter for the mobile station according to the power control pattern; and a transmission power determining unit 730 configured to determine the transmission power of the mobile station based on the reference power control parameter.

The mobile station 700 belongs to a power control group, where mobile stations in the power control group correspond to a same power control pattern. In this case, the pattern acquiring unit 710 may acquire a power control pattern for the power control group. For example, when mobile stations access the base station, the base station may determine groups and power control patterns corresponding to the respective groups according to location information of the mobile stations. Moreover, the mobile station may receive high layer signaling from the base station and determine the power control pattern of the mobile station from the high layer signaling. For example, the base station may give a number of the power control pattern in the high layer signaling, and the mobile station receives the high layer information and obtains the number corresponding to the power control pattern or the like by parsing the information.

The pattern acquiring unit 710 may include a variety of implementations. Three implementation block diagrams of the pattern acquiring unit 710 will be described below in conjunction with FIGS. 8-11. Moreover, the mobile station involved in the solutions of the first and second examples below belong to a certain power control group, and the mobile station involved in the solution of the third example may not belong to any power control group. For the grouping method and principle of the power control group involved, reference may be made to the above related descriptions, and details are omitted herein.

Figure 8:
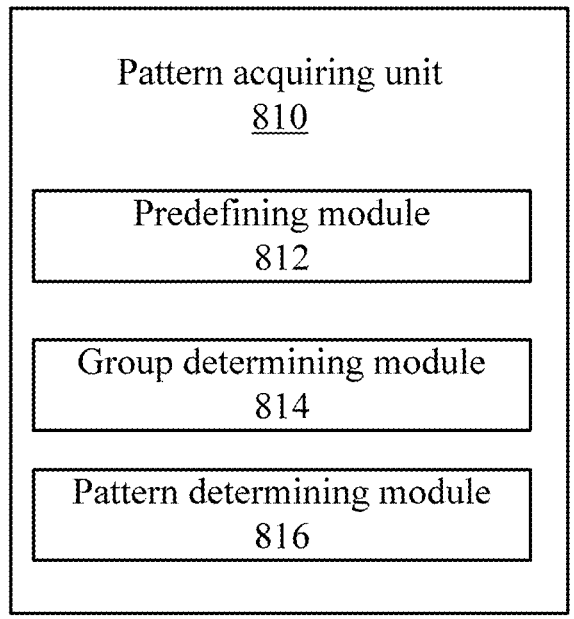
FIG. 8 is a block diagram schematically illustrating a structure of a mobile station of the embodiment.

FIG. 8 shows a first example of the pattern acquiring unit 710. The pattern acquiring unit 810 shown with reference to FIG. 8 may include: a predefining module 812 configured to determine corresponding relations between the respective predefined power control groups and respective power control patterns; a group determining module 814 configured to determine a power control group to which the mobile station belongs; and a pattern determining module 816 configured to determine a power control pattern corresponding to the power control group to which the mobile station belongs based on the corresponding relations.

Moreover, the power control pattern acquired by the pattern acquiring unit 810 includes a target received signal level of the mobile station and a path loss factor. In this case, the reference determining unit 720 shown in FIG. 7 also calculates the reference transmission power based on the target received signal level of the mobile station and the path loss factor.

Figure 9:
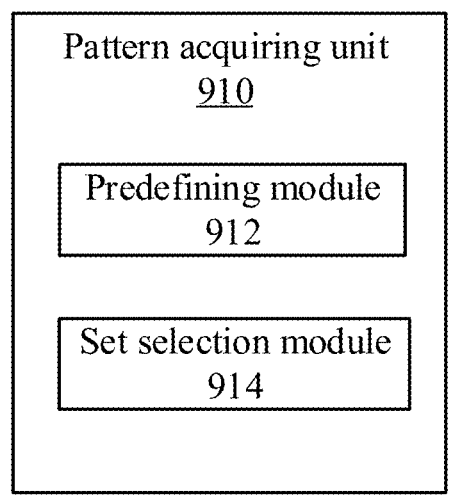
FIG. 9 is a block diagram 1 schematically illustrating a structure of a pattern acquiring unit included in a mobile station.

FIG. 9 shows a second example of the pattern acquiring unit 710. Referring to FIG. 9, a pattern acquiring unit 910 may include: a predefining module 912 configured to predefine a plurality of transmission power sets; and a set selection module 914 configured to select, from the plurality of transmission power sets, a transmission power set corresponding to the power control group to which the mobile station belongs, as the power control pattern, where the selected transmission power set including at least one transmission power value. In this case, the reference determining unit 720 shown in FIG. 7 determines each transmission power value in the selected transmission power set as the reference power control parameter for the mobile station.

The predefining module 912 in FIG. 9 may predefine the plurality of transmission power sets, each having a different number of transmission power values. In this case, the set selecting module 914 shown in FIG. 9 selects a transmission power set with more transmission power values when the power control group to which the mobile station belongs is far away from a communication base station, and selects a transmission power set with fewer transmission power values when the power control group to which the mobile station belongs is close to the communication base station. A specific example provided by the present invention may be illustrated in conjunction with FIG. 1B. In the example, the plurality of transmission power sets include three transmission power sets, which are a first power set, a second power set, and a third power set, respectively. The first power set includes four different transmission power values, the second power set includes two different transmission power values, and the third power set includes one transmission power value. As shown in FIG. 1B, there are three power control groups corresponding to the example. In this case, according to the above principle, the central user group 1 shown in FIG. 1B may select the first power set (i.e., select the first power set with the most transmission power values when the power control group where the mobile station is located is closest to the communication base station), the middle user group 2 may select the second power set, and the edge user group 3 may select the third power set (i.e., select the third power set with least transmission power value when the power control group where the mobile station is located is farthest from the communication base station). The main purpose of adopting this example is to allocate a power set with more transmission power values to a power control group with more accessing users for selection by each mobile station. This may effectively improve the efficiency and accuracy of distinguishing users of the power control group that have similar path losses at the receiving end.

Figure 10:
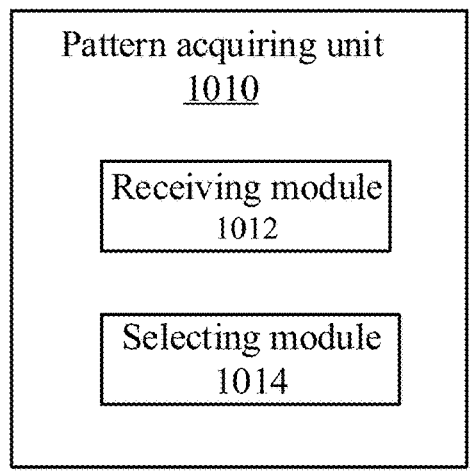
FIG. 10 is a block diagram 2 schematically illustrating a structure of a pattern acquiring unit included in a mobile station.

FIG. 10 shows a third example of the pattern acquiring unit 710, in which the pattern acquiring unit involved acquires a transmission power offset pattern, which is pattern information related to an offset of the transmission power of a mobile station, as the power control pattern.

When the exemplary pattern acquiring unit 1010 shown in FIG. 10 is adopted, the pattern acquiring unit 1010 may include: a receiving module 1012 configured to receive a common reference threshold that depends on the path loss; and a selecting module 1014 configured to select, based on the common reference threshold and the path loss of the mobile station, the transmission power offset set, from at least two candidate transmission power offset sets each of which includes at least two transmission power offset values, as the power control pattern.

When the exemplary pattern acquiring unit 1010 is adopted, the reference determining unit 720 shown in FIG. 7 may determine the reference power control parameter for the mobile station by the following operations: calculating accessing probability for accessing each of the transmission power offset values in the selected transmission power offset set, based on a number of the transmission power offset values in the selected transmission power offset set; and selecting the transmission power offset value from the selected transmission power offset set according to the accessing probability. Moreover, the reference determining unit 720 shown in FIG. 7 may also select the transmission power offset value from the selected transmission power offset set based on the downlink control information received from the base station.

When the exemplary pattern acquiring unit 1010 is adopted, the transmission power determining unit 730 shown in FIG. 7 may calculate the transmission power of the mobile station based on the initial transmission power of the mobile station and the selected transmission power offset value, and for a specific calculation formula in this case, refer to the above formula (1). For acquisition of the related parameters involved in the formula (1), reference may also be made to the related embodiments, and details are omitted herein.

Moreover, when the exemplary pattern acquiring unit 1010 is adopted, the transmission power determining unit 730 shown in FIG. 7 may also calculate the transmission power of the mobile station based on the reference transmission power of the mobile station and the selected transmission power offset value, and for a specific calculation formula in this case, refer to the above formula (2). For acquisition of the related parameters involved in the formula (2), reference may also be made to the related embodiments, and details are omitted herein.

In addition, the mobile station involved in the exemplary solution shown in FIG. 10 may also belong to a power control group, where respective mobile stations in the power control group correspond to a same power control pattern, and the pattern acquiring unit acquires a power control pattern for the power control group.

Figure 11:
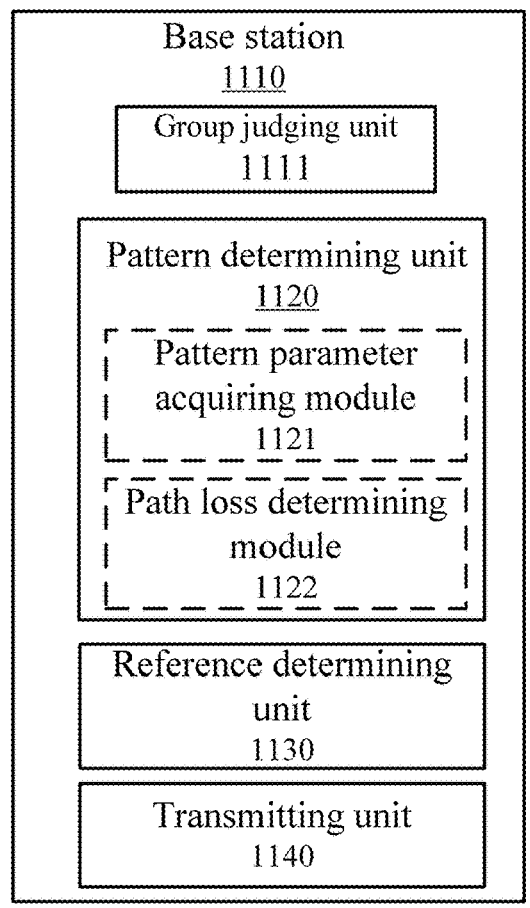
FIG. 11 is a block diagram schematically illustrating a structure of a base station according to an embodiment of the present disclosure.

FIG. 11 is a block diagram schematically illustrating a structure of a base station 1110 according to an embodiment of the present disclosure. The base station 1110 corresponds to the base station 101 shown in FIG. 1, and the base station 1110 may be used to perform the related technical solutions of the embodiment corresponding FIG. 6 described above.

As shown in FIG. 11, the base station 1110 may include: a group judging unit 1111 configured to judge a power control group to which the mobile station belongs; a pattern determining unit 1120 configured to determine a power control pattern of the power control group; a reference determining unit 1130 for determining a reference power control parameter for the power control group; and a transmitting unit 1140 configured to transmit to the mobile station control instruction for instructing the mobile station to transmit a power signal based on the reference power control parameter.

The pattern determining unit 1120 shown in FIG. 11 may include: a pattern parameter acquiring module 1121 configured to acquire a target received signal level of the mobile station and a path loss factor; a path loss determining module 1122 configured to determine a path loss of the mobile station. In this case, the reference determining unit 1120 shown in FIG. 11 calculates the reference transmission power based on the target received signal level, the path loss factor, and the path loss. Therein, the path loss determining module 1121 may calculate the path loss of the mobile station based on historical uplink transmission data of other mobile stations of the power control group to which the mobile station belongs, in the case where there is no historical uplink transmission data of the mobile station. Moreover, the path loss determining module 1121 may calculate the path loss of the mobile station based on the historical uplink transmission data of the mobile station, in the case where there is the historical uplink transmission data of the mobile station.

The transmitting unit 1140 may use the reference transmission power calculated by the reference determining unit 1130 as a part of content of the control instruction. The mobile station then receives the control instruction, obtains the reference transmission power by parsing the control instruction, and uses the power transmitted by the base station as the actual transmission power of the mobile station. Alternatively, after the mobile station obtains the reference transmission power by parsing the control instruction, the actual transmission power of the mobile station is determined in conjunction with the related technical solution for determining the power offset value and the formula (3) disclosed in the above fourth embodiment.

Figure 12:
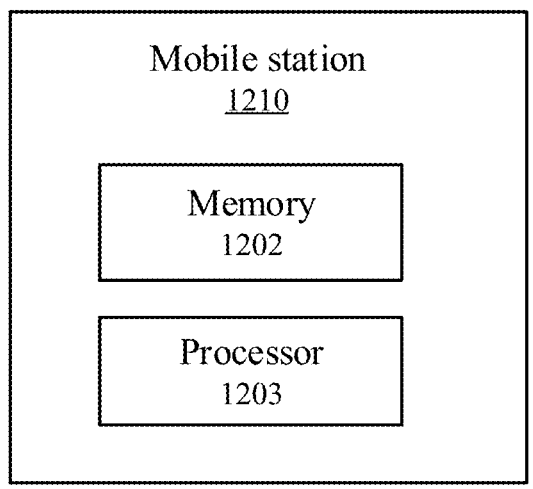
FIG. 12 is a schematic diagram schematically illustrating a hardware structure of a mobile station.

FIG. 12 is a block diagram that schematically illustrating a mobile station 1210 according to an embodiment of the present disclosure.

As shown in FIG. 12, the mobile station 1210 may include a memory 1202 configured to store program codes, and a processor 1203 configured to execute the program codes to implement the method described in conjunction with FIGS. 2-5.

The memory 1202 may include at least one of a Read-Only memory and a random access memory, and provide instructions and data to the processor 1203. A part of the memory 1202 may also include a non-volatile random access memory (NVRAM).

The processor 1203 may be a general purpose processor, a digital signal processor (DSP), an application specific integrated circuit (ASIC), a field-programmable gate array (FPGA), or other programmable logic device, a discrete gate or transistor logic device, or a discrete hardware component. The general purpose processor may be a microprocessor, any conventional processor, or the like.

The steps of the methods disclosed in the embodiments of the present invention may be directly embodied as being performed and completed by the processor, or being performed and completed by a combination of a hardware module in the processor and a software module. The software module may be located in a conventional storage medium in this field, such as a random access memory, a flash memory, a read only memory, a programmable read only memory or an electrically erasable programmable memory, a register, or the like. The storage medium is located in the memory 1202, and the processor 1203 reads the information in the memory 1202 and completes the steps of the above method in conjunction with its hardware.

After the above mobile station 700 and mobile station 1210 are disclosed, user equipment including any of the mobile stations is also within the scope of the disclosure of the embodiments of the present disclosure.

In addition, the base station shown in FIG. 11 may also include the processor or the memory shown in FIG. 12, and the functions and structures to be implemented by the processor and the memory in the base station are similar to those of the mobile station in FIG. 12, and details are omitted herein. Moreover, the processor in the base station may be used to perform the method corresponding to the embodiment in FIG. 6.

Those of ordinary skill in the art may appreciate that the units and algorithm steps of the various examples described in conjunction with the embodiments disclosed herein may be implemented in electronic hardware or a combination of computer software and electronic hardware. Whether these functions are performed in hardware or in software depends on specific applications and design constraints of the technical solution. For each specific application, those skilled in the art may use different methods to implement the described functions, but such implementation should not be considered to go beyond the scope of the present invention.

Those skilled in the art may clearly understand that, for the convenience and brevity of the description, for the specific working processes of the devices and the units described above, reference may be made to the corresponding processes in the foregoing method embodiments, and details are omitted herein.

In the several embodiments provided by the present application, it should be understood that the disclosed devices and method may be implemented in other manners. For example, the apparatus embodiments described above are merely illustrative. For example, the division of the units is only a division of logical functions. In actual implementation, there may be another division manner. For example, a plurality of units or components may be combined or may be integrated into another device, or some features may be ignored or not performed.

The units described as separate components may be or may not be physically separate, and the components shown as units may be or may not be physical units. Part or all of the units may be selected according to actual needs to achieve the purpose of the solutions of the embodiments.

The functions may be stored in a computer readable storage medium, if implemented in the form of a software functional unit and sold or used as an independent product. Based on such understanding, essentially, the technical solution of the present invention, or a part which contributes to the prior art, or a part of the technical solution, may be embodied in the form of a software product. The computer software product is stored in a storage medium, including several instructions that are used to cause a computer device (which may be a personal computer, a server, a network device, or the like) to perform all or part of the steps of the methods described in respective embodiments of the present invention. The foregoing storage medium may be various medium that may store program codes, including a flash disk, a mobile hard disk, a read only memory, a random access memory, a magnetic disk, an optical disk, or the like.

The above are only specific embodiments of the present invention, but the scope of the present invention is not limited thereto, and any changes or substitutions within the technical scope of the present disclosure that are readily conceivable to those skilled in the art should be covered by the scope of the present invention. Therefore, the protection scope of the invention should be determined by the scope of the claims.

This application claims priority to the Chinese Patent Application No. 201610697169.6, filed on Aug. 19, 2016, herein incorporated by reference in its entirety as a part of the disclosure.

What is claimed is:

1. A mobile station, comprising:
   a processor; and
   a storage medium having computer program instructions stored thereon, wherein the computer program instructions, when executed by the processor, perform processing of:
   acquiring a power control pattern, which is information related to a scheme for controlling a transmission power;
   determining a reference power control parameter for the mobile station according to the power control pattern; and
   determining a transmission power of the mobile station based on the reference power control parameter,
   wherein the processor acquires a transmission power offset pattern, which is pattern information related to an offset of the transmission power of the mobile station, as the power control pattern, and
   wherein the processor is configured to receive a common reference threshold that depends on a path loss, and select, based on the common reference threshold and the path loss of the mobile station, a transmission power offset set, from at least two candidate transmission power offset sets each of which includes at least two transmission power offset values, as the power control pattern.

2. The mobile station of claim 1, wherein
   the mobile station belongs to a power control group, in which mobile stations correspond to a same power control pattern; and
   the processor is configured to acquire a power control pattern for the power control group.

3. The mobile station of claim 2, wherein the processor is configured to:
   determine corresponding relations between respective predefined power control groups and respective power control patterns;

determine the power control group to which the mobile station belongs based on a reference signal received power of the mobile station; and determine the power control pattern corresponding to the power control group to which the mobile station belongs, based on the corresponding relations.

4. The mobile station of claim 2, wherein the power control pattern acquired by the processor includes a target received signal level of the mobile station and a path loss factor; and wherein the processor calculates a reference transmission power based on the target received signal level and the path loss factor when the path loss of the mobile station is zero.

5. The mobile station of claim 2, wherein the processor is configured to:

predefine a plurality of transmission power sets;

select, from the plurality of transmission power sets, a transmission power set corresponding to the power control group to which the mobile station belongs, as the power control pattern, the selected transmission power set including at least one transmission power value, and wherein the processor determines respective transmission power values in the selected transmission power set as the reference power control parameter for the mobile station.

6. The mobile station of claim 5, wherein the processor predefines the plurality of transmission power sets, each having a different number of transmission power values; and the processor selects a transmission power set with more transmission power values, when the power control group to which the mobile station belongs is far away from a communication base station, and selects a transmission power set with fewer transmission power values, when the power control group to which the mobile station belongs is close to the communication base station.

7. The mobile station of claim 1, wherein the processor determines the reference power control parameter for the mobile station by:

calculating accessing probability for accessing each of transmission power offset values in the selected transmission power offset set, based on a number of the transmission power offset values in the selected transmission power offset set; and selecting a transmission power offset value from the selected transmission power offset set according to the accessing probability.

8. The mobile station of claim 1, wherein the processor selects the transmission power offset value from the selected transmission power offset set based on downlink control information received from a base station.

9. The mobile station of claim 7, wherein the processor calculates the transmission power of the mobile station based on an initial transmission power of the mobile station and the selected transmission power offset value.

10. A method for controlling a transmission power, applied to a mobile station, the method comprising:

acquiring a power control pattern, which is information related to a scheme of controlling the transmission power;

determining a reference power control parameter for the mobile station according to the power control pattern; and determining the transmission power of the mobile station based on the reference power control parameter, wherein the acquiring a power control pattern includes acquiring a transmission power offset pattern, which is pattern information related to an offset of the transmission power of the mobile station, as the power control pattern, and wherein a common reference threshold that depends on a path loss is received, and a transmission power offset set is selected, from at least two candidate transmission power offset sets each of which includes at least two transmission power offset values as the power control pattern, based on the common reference threshold and the path loss of the mobile station.

11. The method of claim 10, wherein the mobile station belongs to a power control group, in which mobile stations correspond to a same power control pattern, and the acquiring a power control pattern includes:

acquiring a power control pattern for the power control group.

* * * * *